(12) United States Patent
Mazarick

(10) Patent No.: US 9,749,149 B2
(45) Date of Patent: *Aug. 29, 2017

(54) SYSTEM AND METHOD FOR INITIALIZING AND MAINTAINING A SERIES OF VIRTUAL LOCAL AREA NETWORKS CONTAINED IN A CLUSTERED COMPUTER SYSTEM

(71) Applicant: Michael Emory Mazarick, Raleigh, NC (US)

(72) Inventor: Michael Emory Mazarick, Raleigh, NC (US)

(73) Assignee: Virtudatacenter Holdings, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,218

(22) Filed: Mar. 7, 2016

(65) Prior Publication Data
US 2017/0170988 A1 Jun. 15, 2017

Related U.S. Application Data

(60) Continuation-in-part of application No. 14/040,805, filed on Sep. 30, 2013, now Pat. No. 9,282,055, which
(Continued)

(51) Int. Cl.
| | |
|---|---|
| *G06F 15/173* | (2006.01) |
| *H04L 12/46* | (2006.01) |
| *H04L 29/08* | (2006.01) |
| *H04L 12/24* | (2006.01) |
| *H04L 29/06* | (2006.01) |

(Continued)

(52) U.S. Cl.
CPC ...... *H04L 12/4641* (2013.01); *G06F 9/45533* (2013.01); *G06F 9/5077* (2013.01); *H04L 9/0897* (2013.01); *H04L 41/22* (2013.01); *H04L 63/0209* (2013.01); *H04L 67/1004* (2013.01)

(58) Field of Classification Search
USPC ....... 709/212, 217, 224, 203, 206, 219, 223, 709/226, 228, 231, 232, 238; 707/667
See application file for complete search history.

(56) References Cited

U.S. PATENT DOCUMENTS

| | | | |
|---|---|---|---|
| 5,684,800 | A | 11/1997 | Dobbins |
| 6,035,105 | A | 3/2000 | McCloghrie |

(Continued)

*Primary Examiner* — Quang N Nguyen

(57) ABSTRACT

A system and method for sharing network resources, the system comprising at least one network switch, at least one computing device comprising at least one network connection and at least one storage device containing software capable of initializing and maintaining: (i) a management local area network (MLAN) comprising a virtual or physical firewall; and (ii) a plurality of client virtual local area networks (VLANs), wherein each client VLAN comprises a virtual firewall and a plurality of network resources. In one implementation, the present invention comprises an encrypted folder storing at least an encryption key accessible by customer/client to utilize/add at least additional virtual resources of the networkable computing devices deprived of configuration second time with zero cost and downtime (after initial configuration is already performed). The customer/client having legitimate encryption keys to access the virtual resources can further change at least configuration of the virtual resources.

22 Claims, 9 Drawing Sheets

Related U.S. Application Data is a division of application No. 13/113,919, filed on May 23, 2011, now Pat. No. 8,549,607, which is a division of application No. 11/977,143, filed on Oct. 23, 2007, now Pat. No. 7,975,033.

(51) Int. Cl.
*H04L 9/08* (2006.01)
*G06F 9/455* (2006.01)
*G06F 9/50* (2006.01)

(56) References Cited

U.S. PATENT DOCUMENTS

| | | |
|---|---|---|
| 6,167,052 A | 12/2000 | McNeil |
| 7,002,976 B2 | 2/2006 | Dupont |
| 7,055,171 B1* | 5/2006 | Martin ................ H04L 12/4641 709/217 |
| 7,062,559 B2 | 6/2006 | Yoshimura |
| 7,072,807 B2 | 7/2006 | Brown |
| 7,103,647 B2 | 9/2006 | Aziz |
| 9,342,806 B2* | 5/2016 | Urban ............ G06Q 10/063114 |
| 2004/0066780 A1 | 4/2004 | Shankar |
| 2005/0190773 A1 | 9/2005 | Yang |
| 2007/0043860 A1* | 2/2007 | Pabari ................... G06F 9/5072 709/224 |
| 2007/0067435 A1 | 3/2007 | Landis |
| 2007/0073858 A1 | 3/2007 | Lakshumi |
| 2012/0084262 A1* | 4/2012 | Dwarampudi ...... G06F 11/1448 707/667 |
| 2012/0233282 A1* | 9/2012 | Voccio ................ G06F 9/45558 709/212 |

\* cited by examiner

SYSTEM AND METHOD FOR INITIALIZING AND MAINTAINING A SERIES OF VIRTUAL LOCAL AREA NETWORKS CONTAINED IN A CLUSTERED COMPUTER SYSTEM

CROSS-REFERENCE TO RELATED APPLICATIONS

This application is a continuation-in-part application of U.S. application Ser. No. 14/040,805, filed on Sep. 30, 2013 now U.S. Pat. No. 9,282,055 issued on Mar. 8, 2016, and claiming priority from an application, which is a divisional of, and claims priority to application Ser. No. U.S. Ser. No. 13/113,919, filed on May 23, 2011 now U.S. Pat. No. 8,549,607 and issued Oct. 1, 2013, which is a divisional of, and claims priority to, application Ser. No. 11/977,143, filed on Oct. 23, 2007 now U.S. Pat. No. 7,975,033 and issued on Jul. 5, 2011.

BACKGROUND OF THE INVENTION

Traditionally, clients of a data center are required to buy or rent physical servers, switches, and storage arrays to put into data centers to house items such as web applications, databases, VoIP servers, data servers, etc. This can be extremely costly for small businesses which may only need to run a small web application such as a storefront or a payroll application. Alternatively, the same client can rent web space on a database and web server, but is often limited to what can be done with it, number of users or databases that can be contained within, or how much traffic it can receive.

What is needed is a system where a client may purchase CPU cycles, storage, and network resources "a la carte," being able to obtain only what is required by their business, no more, no less. It would be beneficial to the client to be able to purchase these resources on the fly, as needed, without having to leave the comfort of the office and having them work automatically. There would be nothing to hookup, nor anything to configure so that hardware works with one another. In addition to fully-functional servers, clients may lease shared resources and have them integrate with existing infrastructures seamlessly.

In the field of metropolitan area networks (MANs), a system is used to isolate users into virtual local area networks, or VLANs. Recently, the idea of encapsulating a VLAN inside another VLAN has been introduced simply to be able to house more users. While before network engineers were limited to 256 VLANs on most equipment, they may now be able to use 256×256 separate VLANs.

What is described herein is using the concepts of VLANs and virtualization on a large pooled system to be able to dynamically allocate network resources to users, as well as bridge and share network resources.

Herein, the term "computing device" refers to any electronic device with a processor and means for data storage. Used herein, the term "network connection" refers to any means to allow a plurality of computing devices to communicate. Further, the term "trunked" used herein refers to programmatically relating multiple network connections to each other to create redundancy and greater bandwidth in a single logical connection. The term "network packets" refers to a formatted message in the form of packets transmitted over a network. The term "hardware resource" refers to a networkable computing device. The term "virtual resource" refers to an allocation on a networkable computing device which refers to a virtual representation of a computing device or a software application, such as a database. Used herein, the term "management local area network", sometimes referred to as a "MLAN", refers to a LAN containing hardware or virtual resources used exclusively for the initialization, configuration, and maintenance of other LANs. Used herein, the term "data center" refers to a central storage complex containing a multitude of servers and network routing hardware. A "traditional data center" is a data center absent of virtualization. The term "virtual firewall" refers to a virtual implementation of a firewall with a virtual Ethernet port. Used herein, the term, "maintaining" refers to keeping a network resource functioning.

BRIEF SUMMARY

Disclosed herein is a system, method and computer program product for initializing and maintaining a series of virtual local area networks (VLANs) contained in a clustered computer system to replace a traditional data center. A physical network contains a management local area network (MLAN) and numerous client VLANs nested within a top-level VLAN. The MLAN contains at least a physical or virtual firewall. Each client VLAN contains a virtual firewall as well as a number of physical hardware machines and virtual machines maintained by the clustered system. The client VLAN appears as a normal subnet to the user. A network administrator is able to create, change, move, and delete virtual resources contained in a client VLAN dynamically and remotely.

The system itself connects a plurality of computer systems as a clustered system through a switched fabric communications link, such as a switch fabric communications link sold under the name INFINIBAND®. All storage devices in the system are clustered to create a distributed file system, which makes the drives appear to be a giant pool of space in which any particular virtual machine may be contained anywhere within.

Also described herein is a method for sharing a network resource, physical or virtual, between a plurality of client VLANs. The shared resource may be contained in one of the client VLANs, or in a separate top-level VLAN.

In one implementation, a system for organizing and managing network resources is disclosed. The system comprises at least one network switch, and at least one computing device. The computing device includes at least one management console to interface with at least one client, at least one network connection, and at least one storage device. The storage device containing software capable of initializing and maintaining a management local area network (MLAN) comprising a firewall, and a plurality of client virtual local area networks (VLANs), wherein each client VLAN comprises a virtual firewall and a plurality of network resources. The plurality of network resources are virtual resources determined, and allocated via a selection mechanism using at least a resource factor, on at least one networkable computing devices.

In one implementation, a system for organizing and managing network resources is disclosed. The system comprises at least one network switch and at least one server. The server comprises at least one management console to interface with at least one client, at least one network connection, and at least one storage device. The storage device contains a software capable of initializing and maintaining a management local area network (MLAN) comprising a firewall, and a plurality of client virtual local area networks (VLANs), wherein each client VLAN comprises a virtual firewall and a plurality of network resources. The plurality of the network resources are virtual resources determined, and allocated via a selection mechanism using at least a resource factor, on at least one networkable computing devices.

In one implementation, a distributed management system for organizing and managing network resources is disclosed. The distributed management system comprises at least one network switch, and at least one server having at least one management console to interface with at least one client, at least one network connection, and at least one storage device. The storage device contains a software capable of initializing and maintaining a management local area network (MLAN) comprising a firewall, and a plurality of client virtual local area networks (VLANs), wherein each client VLAN comprises a virtual firewall and a plurality of network resources. The plurality of the network resources are virtual resources determined, and allocated via a selection mechanism using at least a resource factor, on at least one networkable computing devices.

In one implementation, a method for organizing and managing network resources is disclosed. The method comprises initializing a management local area network (MLAN) comprising a firewall, adding a plurality of client virtual local area networks (VLANs), wherein each client VLAN comprises a virtual firewall and a plurality of network resources, maintaining MLAN and clients VLANs. The plurality of the network resources are virtual resources determined, and allocated via a selection mechanism using at least a resource factor, on at least one networkable computing devices.

In one implementation, system, method and computer program product having an encrypted folder storing at least an encryption key accessible by customer/client for initializing and maintaining a series of virtual local area networks (VLANs) contained in a clustered computer system to replace a traditional data center is disclosed.

In one implementation, system, method and computer program product for generating, maintaining, and distributing encryption keys accessible by/to customer/client for initializing and maintaining a series of virtual local area networks (VLANs) contained in a clustered computer system to replace a traditional data center is disclosed. The plurality of the network resources are virtual resources are encrypted by the encryption keys to allow the customer/client having legitimate encryption keys to access the virtual resources.

In one implementation, system, method and computer program product allowing customer/client having legitimate encryption keys to access the virtual resources to utilize/add at least additional virtual resources of the networkable computing devices deprived of configuration second time with zero cost and downtime. The customer/client having legitimate encryption keys to access the virtual resources can further change at least configuration of the virtual resources determined second time with zero cost and downtime.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
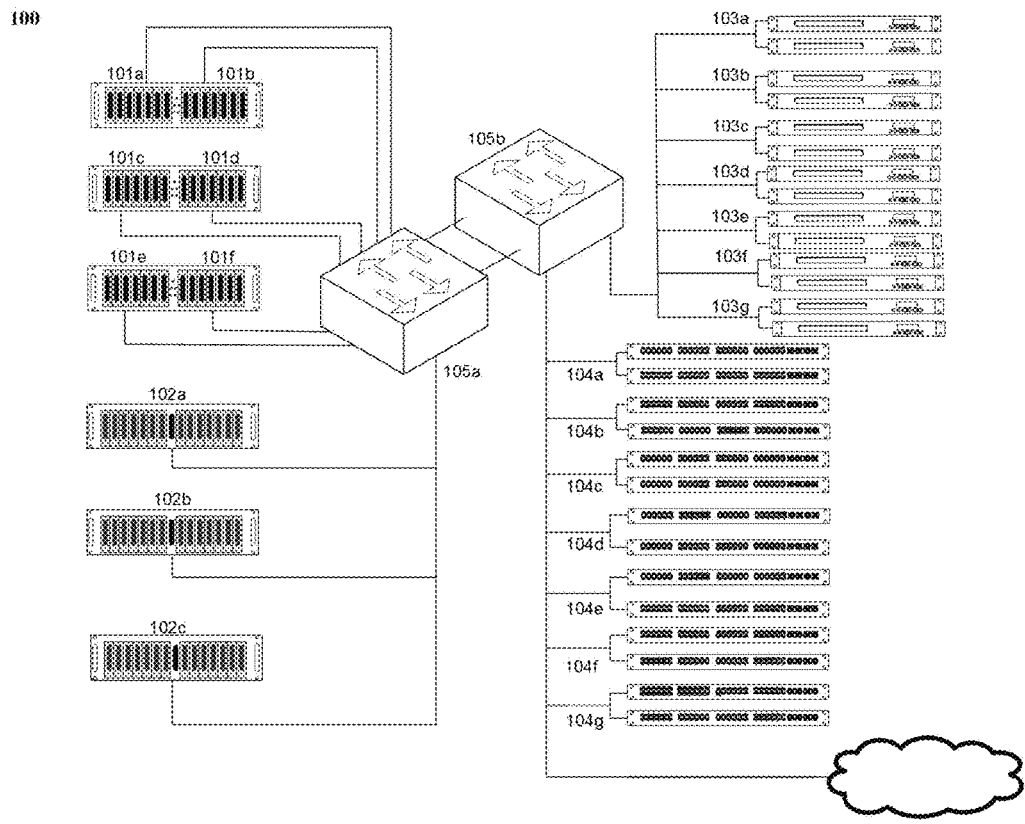
FIG. 1 is a block diagram of the hardware used in the system.

Referring to FIG. 1, system 100 comprises a plurality of redundant array of inexpensive storage nodes (RAIDS) 101 *a*-101 *f*, a plurality of non-redundant storage nodes 102 *a*-102 *c*, a plurality of processing nodes 103 *a*-103 *g*, a plurality of network connections 104 *a*-104 *g*, and a plurality of network switches 105 *a*-105 *b*. Storage nodes 101 *a*-101 *f* are redundant high level storage. Each node is mirrored for a redundant distributed fault tolerant file system. In the embodiment presented in FIG. 1, storage nodes 101 *a* and 101 *b* make a pair, 101 *c* and 101 *d* make a pair, and 101 *e* and 101 *f* make a pair. Non-redundant storage nodes 102 *a* through 102 *c* contain 48 different disk drives with no cross-server redundancy for customers who don't need the added security of redundancy. Each processing node 103 *a* through 103 *g* contains 2, 4, 8, or more dual processors. In the preferred embodiment, network connections 104 *a* through 104 *g* may either be 6 trunked 1 Gbps Ethernet connections, or 2 trunked 4×2.5 Gbps INFINIBAND® connections.

In additional embodiments, network connections 104 may use more or less connections and use other protocols. Network switch 105 *a* may be a switch such as an Ethernet switch or an INFINIBAND® switch depending on what protocol network connections 104 use; network switch 105 *b* is may be a switch such as an Ethernet switch used to communicate outside the network. INFINIBAND® switches use IP-over-INFINIBAND®. The switches are able to add VLANs on a granular level. The switches may natively support Q-in-Q double tagged VLANs, which allow for nested client VLANs out of the box. In other embodiments, all nested client VLAN tags are handled by processing nodes 103. One of ordinary skill in the pertinent art will recognize that the number of components shown in FIG. 1 is simply for illustration and may be more or less in actual implementations.

Figure 2:
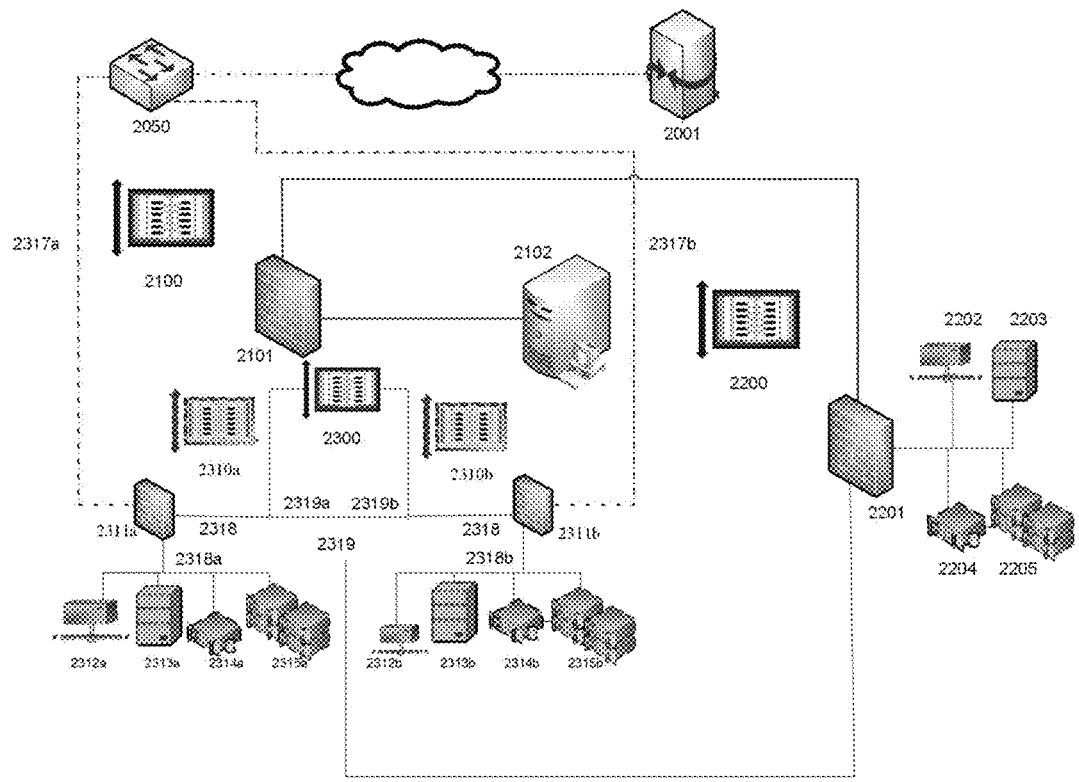
FIG. 2 is a block diagram of the VLAN structure.

Referring to FIG. 2, VLAN 2100 is a top-level VLAN used as a management LAN, or MLAN, containing the firewall 2101 initialized by the storage server. MLAN 2100 is responsible for the initialization, configuration, and maintenance of all client VLANs in system 100, as well as shared resource networks and physical networks on the system. Firewall 2101 has 3 ports, one connected to MLAN 2100, one connected to the untagged Ethernet port "VLAN 0", and one connected to VLAN 2200, the shared resources VLAN. In some embodiments, firewall 2101 is mirrored several times and referred to as a firewall cluster. The firewall cluster is spread across several multiple processing nodes 103 for faster routing. Top-layer VLAN 2300 contains multiple client VLANs 2310, all with their own firewalls, 2311.

One of ordinary skill in the pertinent art will recognize that the numbers of elements depicted in FIG. 2 are only exemplary. For instance, each top-layer VLAN may contain up to 255 client VLANs. On bootup, each storage node 101 contacts each of the other storage nodes to discover whether or not any of them has started the boot process of creating a management firewall 2101 of FIG. 2, a boot server and a management console 2102. If none of the other nodes has started the process yet, the pinging node begins the process. Initially the management firewall 2101 or a management firewall cluster is started. If the MLAN 2100 is routed by a virtual firewall, the storage nodes 101 will need to initially run the process that starts the management firewall cluster. This does not preclude a hardware firewall for the MLAN 2100, but in the preferred embodiment only servers and switches are needed and the same underlying structures that provide redundancy and availability to servers can give high availability to firewalls and routers in a virtual environment.

In this preferred embodiment, a group of storage servers can start redundant copies of the firewall/router 2101. Each instance of the firewall will have the same MAC address and VLAN assignment for any attached Ethernet ports. Using normal routing schemes, this may cause a bank of switches to route packets to differing firewalls depending on the source of a connection, but this will have no ill effects if the network devices in question continue to have the same settings and routing information.

The management console 2102 has many of the same properties as the firewall in system 100. While in the preferred embodiment it is run on the storage nodes 101 as a virtual machine, can likewise be a physical machine. It is started up at the same time as the firewall/router cluster and can also be deployed in a cluster format.

In one embodiment, the boot server contains a tftp server, an NFS server, a PXE boot service and a preconfigured kernel image. This image will have a runtime environment for the local interconnect (INFINIBAND®, trunked Ethernet or other similar high speed interconnect) and the ability to mount the clustered file system that exists across the storage nodes 101. The processing nodes 103 then contact the management console 2102 for initial settings such as an IP address and host name, for example. The clustered file system is mounted and the processing nodes 103 boot in a normal fashion. Once startup is complete the processing nodes 103 contact the management console 2102 and indicate that they are ready to take a load of virtual machines to host for clients.

Once the processing nodes 103 have begun to activate, the management console 2102 gets a list of virtual machines that need to be started up by the processing nodes 103 from its datasource. The management console 2102 then begins to start virtual machines on processing nodes 103 in a weighted round robin fashion. Processing nodes 103 are assigned to groups based on their capabilities and architecture; for example, 64-bit processing nodes would be associated as a group. There is a server mask for each virtual machine that assigns it to a particular processing node group. This is both to comply with per-processor licensing issues and to ensure that virtual servers with particular hardware, redundancy or connectivity requirements can be met by the appropriate physical machine. During the startup process management console 2102 may even initiate a delay if more virtual machines exist than the bank of processing nodes 103 can run. After a predetermined interval, if this imbalance is not corrected, a warning system will be started to alert human operators of the lack of server resources. As the virtual machines are assigned to physical servers, each physical server reports CPU and memory usage to the management console 2102 and these figures are used as selection mechanisms to ensure that processor and memory loads are evenly distributed across all physical nodes. Even after the physical layer is booted, the processing nodes 103 continue to report CPU and memory usage to the management console 2102 at regular intervals.

The virtual servers undergo a normal startup process themselves. Once a command to start a virtual server is issued, (either by a system-wide startup, client start command or other system need) the management console 2102 takes the start request and queries the data source of available processing nodes. Once one is selected by the mechanism mentioned above; that virtual server creates an Ethernet device that is attached to either the top layer VLAN or the Q-in-Q nested VLAN 2310 that the virtual server connects to. Unlike normal Ethernet devices, this VLAN device is not given an IP address or any routing information. The physical server itself does not respond and actually does not see any packets it receives from this interface. The physical device is instead mapped directly to a virtual one, giving the virtual machine access to a completely separate network than the physical machine exists on. After the appropriate network devices are added to a processing node, the management console 2102 then queries its data source and connects to the client's hidden firewall.

Figure 5:
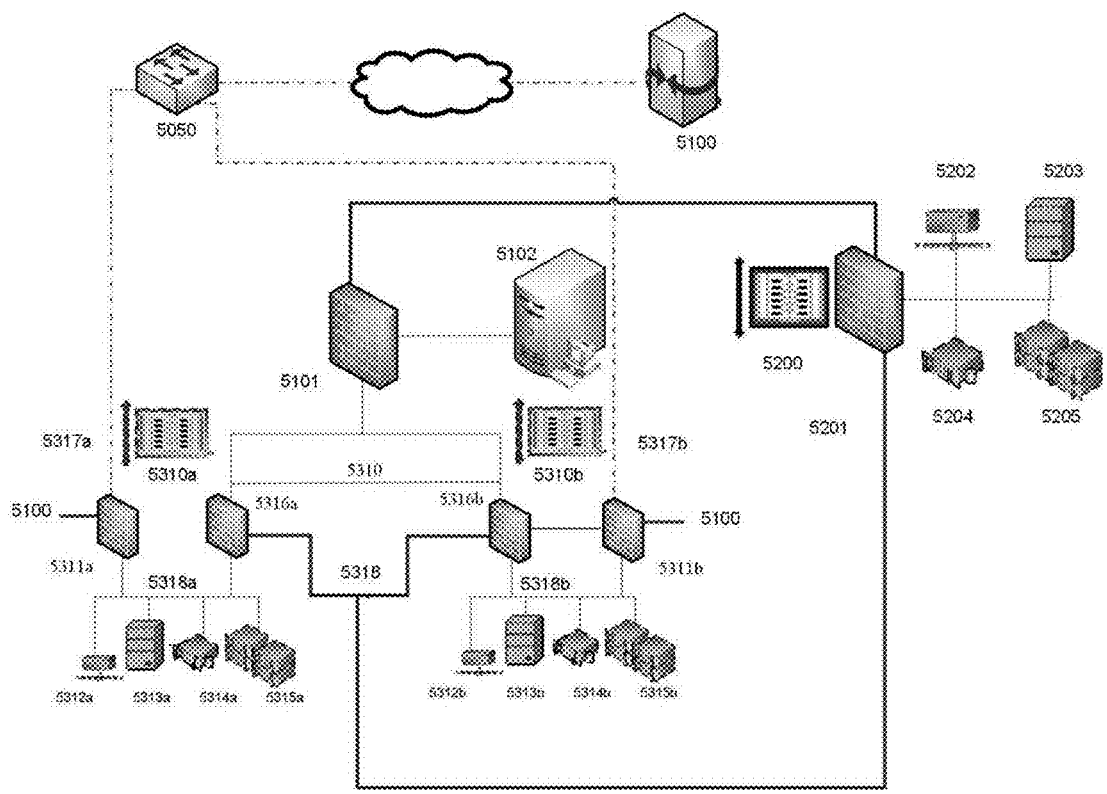
FIG. 5 demonstrates reaching shared resources through private, non-editable client firewalls.

This firewall, as described later in reference to FIG. 5, is for routing console and virtual screen information from the MLAN 2100 back to the client's network and represents a NAT mapping from the MLAN 2100 to the client's subnet. In the current embodiment, a virtual serial port is used to add rules to this virtual routing device to keep the methodology consistent with non-addressable firewalls that clients may want to add rules and configurations to. This is not necessary; however since this translating firewalls an IP address that exists in the MLAN 2100 directly.

On startup of the virtual machine a rule is added to provide the client with console access to a web interface to the management console 2102. This gives the clients the ability to access virtual servers as if they were at the keyboard of a physical machine. From the clients secure management console web interface they are able to control the screen, keyboard and mouse inputs of their virtual servers. In the current embodiment VNC is used as a remote console but other protocols are available. During this process the virtual server itself is issued a start command and is then accessible to the client.

When a new client is added, they are given a number of external IPs and a unique subnet of their network. Every possible IP of the subnet is statically assigned to a MAC address that may or may not be used. A client VLAN 2310 is created and the first address of the subnet is assigned to the client VLAN's firewall 2311. The firewall contains a DHCP table that is created when the firewall is initialized to hold the mappings of the preregistered MAC addresses to IPs so that the IP is known as machines are added. The client is given a gateway 2001 configured to deliver the client's network packets directly to the virtual firewall 2311 through an IPSEC tunnel. In addition, network packets of all external traffic are routed directly to the client's virtual firewall 2311. Virtual firewall 2311 has one port connected to external port 2317 which receives external traffic through network switch 205 b, which is equivalent to network switch 105 b. Traffic from the client through the IPSEC tunnel to the client's personal VLAN 5310a is shown as a dotted line in FIG. 2. Virtual firewall 2311 further has one port connected to their personal client VLAN 2318, and in some embodiments, an optional port for connecting to shared resources 2319, such as those contained in VLAN 2200, or in another client VLAN.

The last address of the subnet is assigned as the management console 2102. The management console 2102 is connected to main firewall 2101 in MLAN 2100 and, in some embodiments, is reached through the optional port of the client firewall. From there, the client may view network settings and add machines 2312-2315. The client is able to create and be charged for virtual machines on their client VLAN through the management console 2102 remotely. The client is capable of adding 253 virtual machines. The virtual machines may be just about any kind of machine, such as a Windows or Linux web server, a voice-over-IP server, etc. After a machine is chosen, a MAC address is assigned from the client firewall 2311 and a template image corresponding to the machine from a storage node 101 is taken and initialized in storage depending on the kind of storage system the client has chosen (redundant storage nodes 101, or non-redundant storage nodes 102). From there, the management console 2102 adds the machine to the list of machines that need to be ran. The next processing node 103 that inquires on tasks that need to be run is assigned the machine. If it is the first machine run on that particular client VLAN, it starts up a virtual listening port for that VLAN. Once the virtual machine is connected to the VLAN, the firewall looks at its MAC address and assigns it its preconfigured IP address from the DHCP table.

The client is able to use VNC or remote desktop to login to the newly created virtual machine and see the user API/GUI as if they were sitting in front of a physical machine with the same image. From there the user is allowed to do anything that can be normally done on a physical machine, completely abstracted from the virtualization of the machine or the fact that it is contained in a VLAN ran on system 100 in a distant data center. To the user, virtual machines 2312-2315 appear to be like any other machine contained on a traditional network subnet.

The client is also able to add a physical machine to their subnet. In the preferred embodiment, the switches natively support Q-in-Q double tagging, which allows for routing double tagged network packets to physical machines out of the box. In other embodiments, the nested client VLAN is turned into another top-layer VLAN to allow for physical machines on the VLAN.

Clients are able to share resources either between their client VLANs, or in a shared resources network such as resources 2202-2205 in VLAN 2200. In some embodiments, clients are able to connect to these resources by setting up the optional port on their client firewall 2311 to connect to the IP of the selected shared resource. An empty VLAN is created between the ports of both firewalls on both sides as a "virtual wire". Rules are set up on the firewalls on both ends to handle the new traffic. On the client VLAN side, firewall 2311 dynamically adds a virtual port to itself and maps the port in a network address table within client firewall 2311. If a client wishes to share resources from more than one location, multiple optional ports may be added. In this situation, the firewall must be temporarily shut down to make the configuration.

Figure 3:
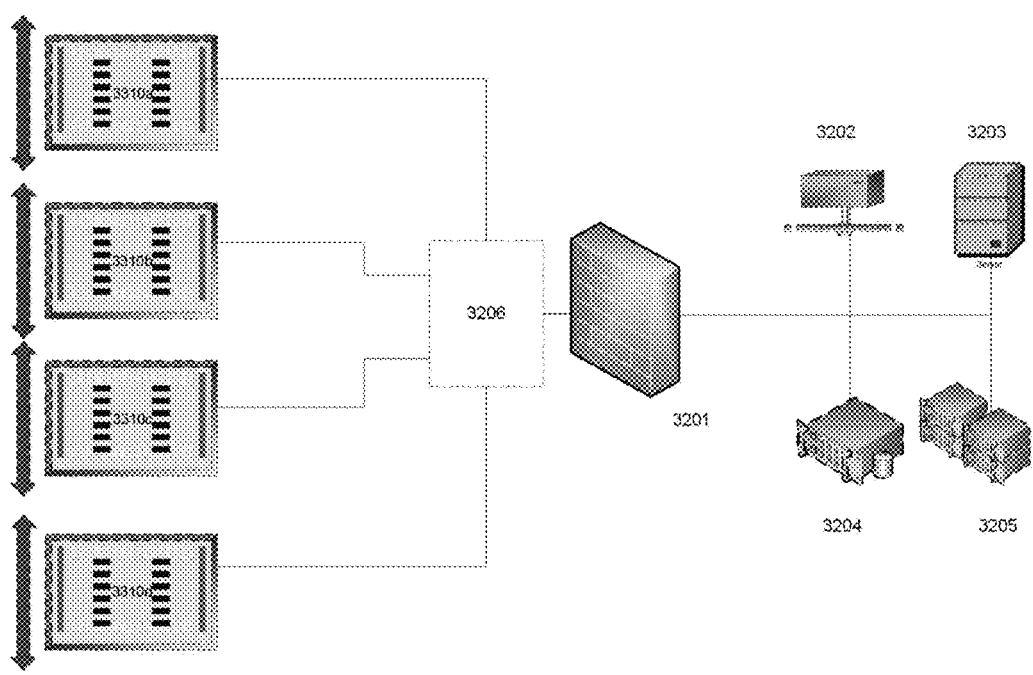
FIG. 3 demonstrates reaching shared resources through a single port of a shared resource firewall.
Figure 4:
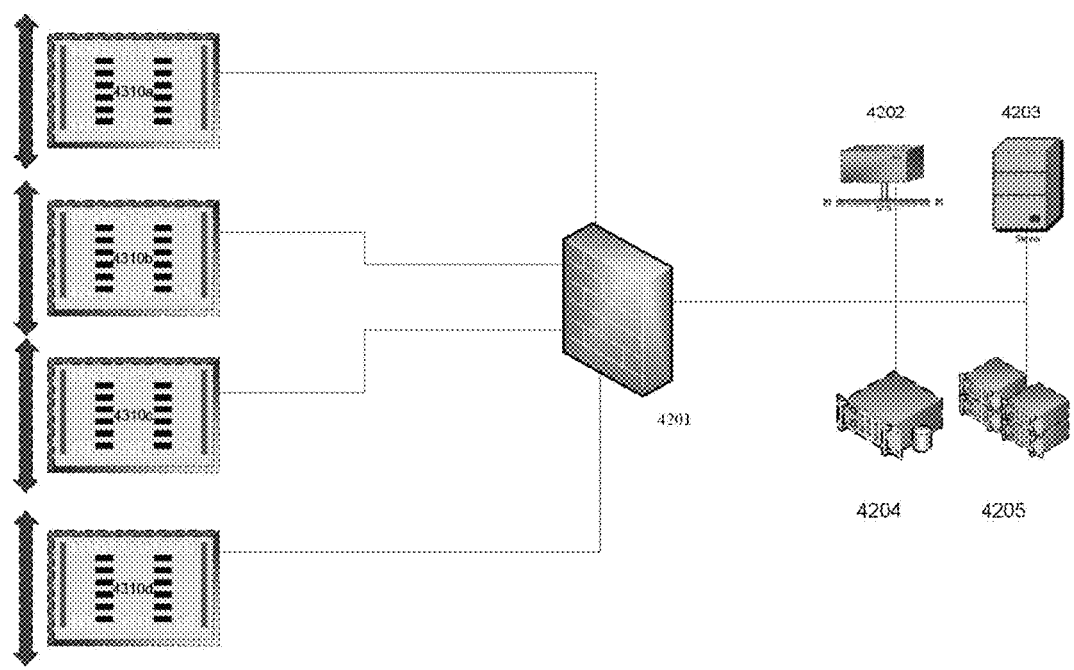
FIG. 4 demonstrates reaching shared resources through multiple ports of a shared resource firewall.

FIG. 3, FIG. 4, and FIG. 5 show alternate embodiments for routing data through system 100. Referring to FIG. 3, shared resource VLAN 3200 and client VLANs 3310 are identical to shared resource network 2200 and client VLANs 2310, respectively. Shared resource firewall 3201 has one port for incoming resource requests. The connection is essentially a "virtual switch", labeled as 3206, that filters traffic based on incoming IPs. Using the "virtual switch", client VLANs 3310 are able to reach their designated shared resources, residing within 3202-3205. Referring now to FIG. 4, shared resource VLAN 4200 and client VLANs 4310 are identical to shared resource network 2200 and client VLANs 2310, respectively. FIG. 4 shows an alternate embodiment that has a separate port on shared resource firewall 4201 for each incoming connection from client VLANs 4310 attempting to use a shared resource 4202-4205. A firewall rule is designed for each individual port.

FIG. 5 illustrates the preferred embodiment of handling shared resources. The system of FIG. 5 is identical to that of FIG. 2 with the addition of each client VLAN 5310 containing a second firewall, private firewall 5316. Private firewall 5316 is not editable by the client and contains predefined rules to reach shared resources within shared resource VLAN 5200 or within another client VLAN, VNC connections to physical machines on the client's subnet, and the management console 5102. Using this non-editable private firewall ensures that a user does not inadvertently change routing rules that hinder routing throughout system 100.

Figure 6:
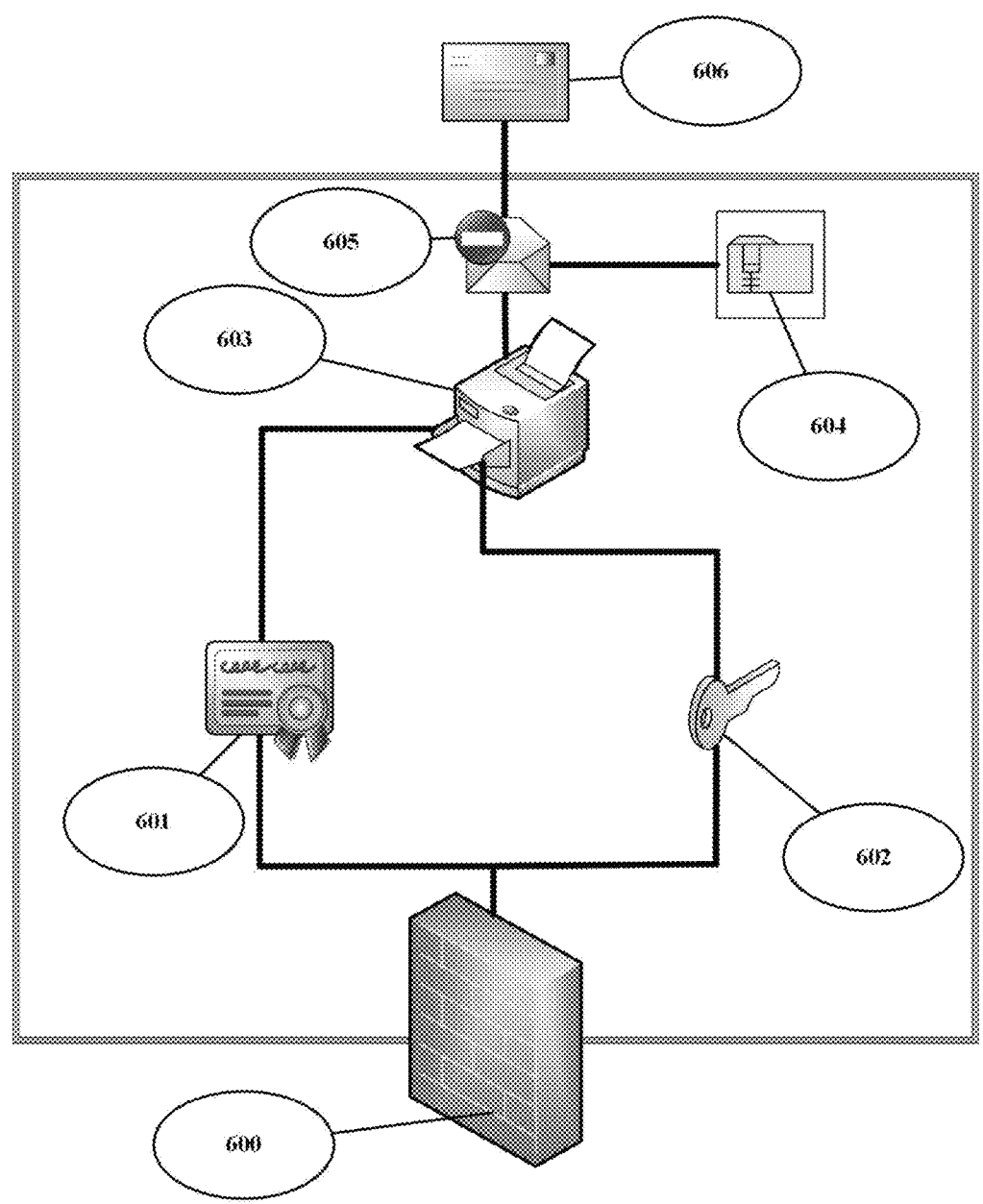
FIG. 6 demonstrates a system for managing and distributing encryption keys to each customer.

FIG. 6 illustrates a system for managing and distributing encryption keys to each customer, in another embodiment of the present invention. In one implementation, the FIG. 6 shows a system, method and computer program product having an encrypted folder storing at least an encryption key accessible by customer/client for initializing and maintaining a series of virtual local area networks (VLANs) contained in a clustered computer system to replace a traditional data center is disclosed.

In one implementation, the FIG. 6 shows a system, method and computer program product for generating, maintaining, and distributing encryption keys accessible by/to customer/client for initializing and maintaining a series of virtual local area networks (VLANs) contained in a clustered computer system to replace a traditional data center is disclosed. The plurality of the network resources are virtual resources are encrypted by the encryption keys to allow the customer/client having legitimate encryption keys to access the virtual resources.

In one implementation, the FIG. 6 shows that VDC may not give encryption keys to each customer, it is the system and method of the present invention to give/distribute encryption keys to each customer that VDC may not see or may not have access to.

In one implementation, the FIG. 6 shows a system, method and computer program product allowing customer/client having legitimate encryption keys to access the virtual resources to utilize/add at least additional virtual resources of the networkable computing devices deprived of configuration second time (after initial configuration is already performed) with zero cost and downtime. The customer/client having legitimate encryption keys to access the virtual resources can further change at least configuration of the virtual resources determined second time (after initial configuration is already performed) with zero cost and downtime.

As shown in FIG. 6 a particular customer and their virtual firewall 600 is in communication with the system. Each customer accessing the system may be provided with a particular customer's certificate 601 and/or a particular customer's private encryption key 602. The customer/client having legitimate encryption keys can only have access the virtual resources to utilize/add at least additional virtual resources of the networkable computing devices deprived of configuration second time (after initial configuration is already performed) with zero cost and downtime.

In one implementation, the present invention is configured to enable or achieve zero configuration i.e., user may add hardware and/or make configurational changes any time with zero cost and downtime after the first time (after initial configuration is already performed).

As shown in FIG. 6, the customer accesses a printer 603 only if the customer has particular customer's certificate 601 and/or the particular customer's private encryption key 602 to access the printer 603. The particular customer's certificate 601 and/or the particular customer's private encryption key 602 are stored/pre-stored in an encrypted folder 604. The encrypted folder 604 verifies the customer based on the keys and certificates stored and only once verified the customer is allows to access resources in the system.

In one embodiment of the present invention, when the legitimate customer is accessing the system the encryption key is generated by the system and communicated to the customer by a hard copy mail that is certified to go to only the addressee (the customer) 605 and/or the a certified, hard copy certified mail that only the customer can receive 606.

In one embodiment while accessing the system if a new encryption key or certificates are generated by the system, the generated new encryption key or certificates are communicated to the customer by a hard copy mail that is certified to go to only the addressee (the customer) 605 and/or the a certified, hard copy certified mail that only the customer can receive 606.

In one embodiment of the present invention, the management console may be responsible to generates and distributes these keys and certificate securely. The management console when required for extra security may generate the encryption keys then digitally sign, encrypt the entire virtual resource using the encryption key automatically or based on the instructions of customer. Then securely distribute the encryption keys only to those service providers or clouds that are "authorized" to access, instantiate or other make use of that virtual resource. The management console may use available commercial certificate authorities or available third party authorities to generate, encrypt and distribute keys securely.

Figure 7:
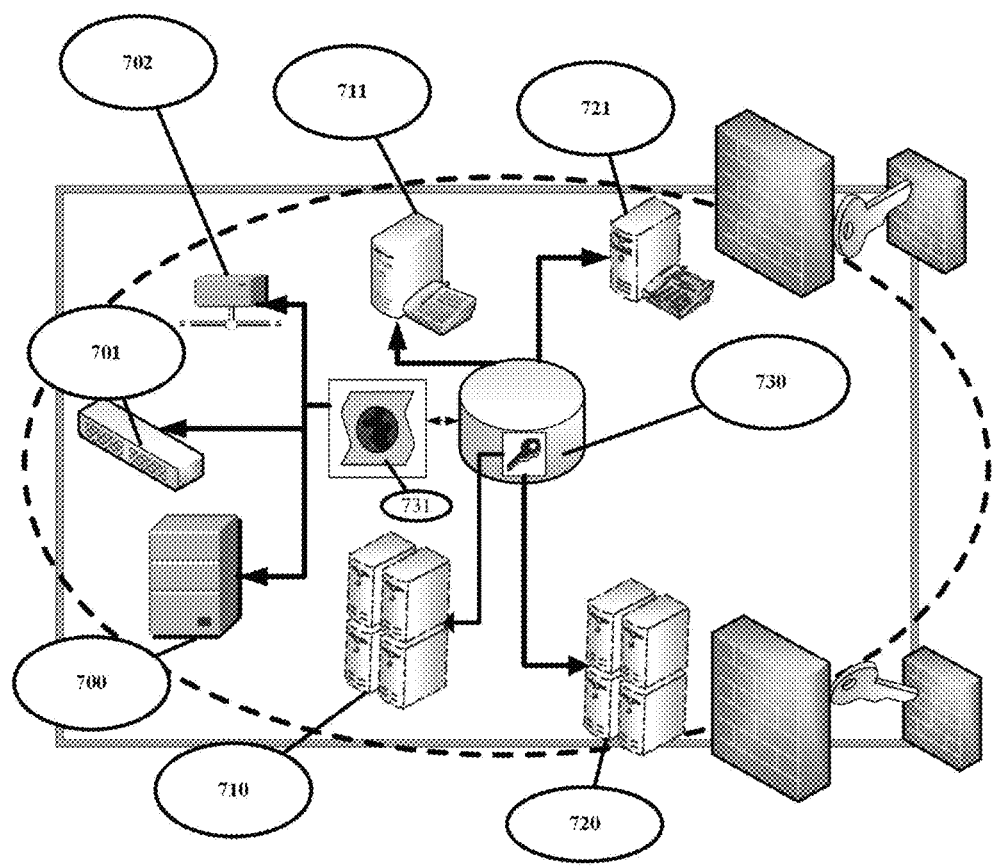
FIG. 7 demonstrates system for organizing and managing network resources.

FIG. 7 illustrates a system for organizing and managing network resources, in accordance with an embodiment of the present invention. FIG. 7 shows how the hardware/virtual setup takes the same amount of time as taken by any other setup, but subsequent configurations are done very rapidly without additional configuration required.

In one embodiment, as shown in FIG. 7, a database 730 store all data (including configuration data) of the management system. A "script engine" 731 that drives the database 730 shown. All the devices or virtual resources or the customers are connected to the database 730. The particular customer's certificate 601 and/or the particular customer's private encryption key 602 are stored/pre-stored in an encrypted folder 604 stored in the database 730.

As shown in FIG. 7, a server 700 (part of the basic physical setup), a network switch 731 (part of the basic physical setup), a network storage volume 702 (part of the basic physical setup), a typical virtual machine 710 (in this case an application server, that is controlled by the management system), a typical physical machine 711 (in this case a VoIP server, that is initiated and controlled by the management system), a typical virtual machine 720 (in this case an application server, that is initiated and controlled by the customer), a typical virtual machine 721 (in this case a VoIP server, that is initiated and controlled by the customer) are connected to, controlled and managed by, the database 730. Further, not numbered in FIG. 7 are two typical, but separate customers represented by a firewall with an encryption key and encrypted connection to another pair of firewalls (one shown for clarity). Also shown but not numbered is the "empty vlan" (the dotted line) representing a network that can't be networked thru which each firewall uses to keep their information separate. In addition, the whole thing is encased in a "wall" (not numbered).

Figure 8:
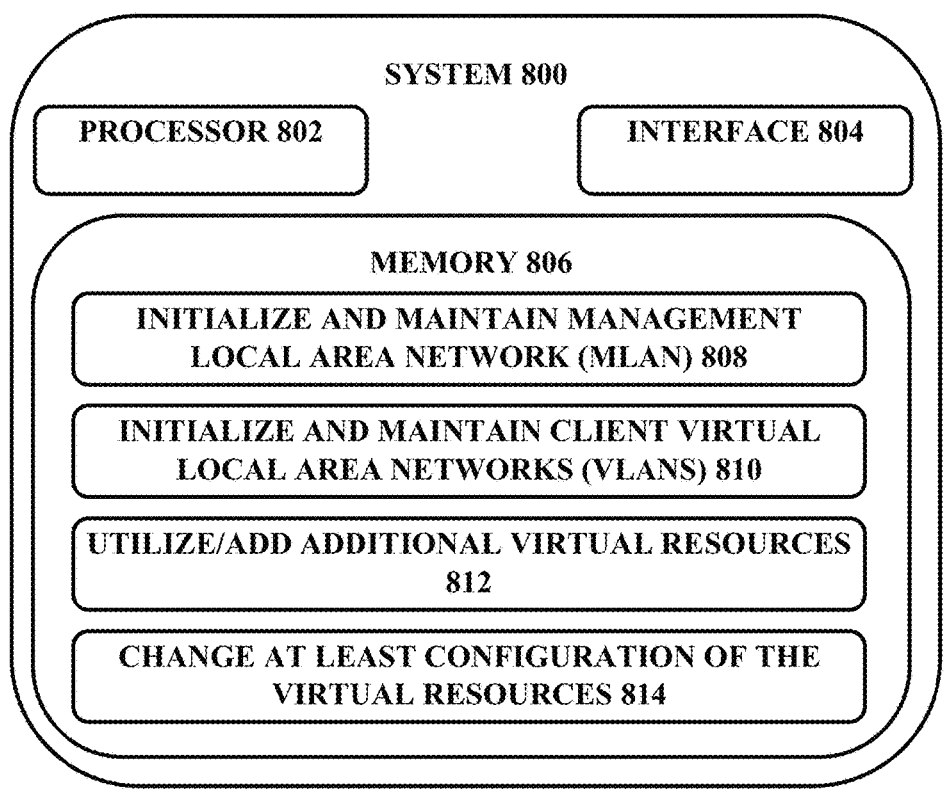
FIG. 8 demonstrates a system for organizing and managing network resources.

FIG. 8 illustrates a system 800 for organizing and managing network resources, in accordance with an embodiment of the present invention. Although the present subject matter is explained considering that the present invention is implemented in the system 800, it may be understood that the present invention may also be implemented in a variety of computing systems, such as a laptop computer, a desktop computer, a notebook, a workstation, a mainframe computer, a server, a network server, and the like. It will be understood that the system 800 may be accessed by multiple users, or applications residing on the database system. Examples of the system 800 may include, but are not limited to, a portable computer, a personal digital assistant, a handheld node, sensors, routers, gateways and a workstation. The system 800 is communicatively coupled to each other and/or other nodes or a nodes or apparatuses to form a network (not shown). Examples of the system 800 may include, but are not limited to, a portable computer, a personal digital assistant, a handheld node, sensors, routers, gateways and a workstation.

The system 800 is communicatively coupled to each other and/or other nodes or a nodes or apparatuses to form a network (not shown). In one implementation, the network (not shown) may be a wireless network, a wired network or a combination thereof. The network can be implemented as one of the different types of networks, such as GSM, CDMA, LTE, UMTS, intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network nodes, including routers, bridges, servers, computing nodes, storage nodes, and the like.

The system 800 may include a processor 802, an interface 804, and a memory 806. The processor 802 may be implemented as one or more microprocessors, microcomputers, microcontrollers, digital signal processors, central processing units, state machines, logic circuitries, and/or any nodes that manipulate signals based on operational instructions. Among other capabilities, the at least one processor is configured to fetch and execute computer-readable instructions or modules stored in the memory 806.

The interface (I/O interface) 804, may include a variety of software and hardware interfaces, for example, a web interface, a graphical user interface, and the like. The I/O interface may allow the database system, the first node, the second node, and the third node to interact with a user directly. Further, the I/O interface may enable the node 804 to communicate with other nodes or nodes, computing nodes, such as web servers and external data servers (not shown). The I/O interface can facilitate multiple communications within a wide variety of networks and protocol types, including wired networks, for example, GSM, CDMA, LAN, cable, etc., and wireless networks, such as WLAN, cellular, or satellite. The I/O interface may include one or more ports for connecting a number of nodes to one another or to another server. The I/O interface may provide interaction between the user and the system 800 via, a screen or management console provided for the interface.

The memory 806 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 806 may include plurality of instructions or modules or applications to perform various functionalities. The memory includes routines, programs, objects, components, data structures, etc., which perform particular tasks or implement particular abstract data types.

In one implementation, a system 800 for organizing and managing network resources is disclosed. The system comprises at least one network switch, and at least one computing device. The computing device includes at least one management console 804 to interface with at least one client, at least one network connection, and at least one storage device. The storage device containing software is capable of initializing and maintaining a management local area network (MLAN) comprising a firewall 808, and a plurality of client virtual local area networks (VLANs) 810, wherein each client VLAN comprises a virtual firewall and a plurality of network resources. The plurality of network resources are virtual resources determined, and allocated via a selection mechanism using at least a resource factor, on at least one networkable computing devices.

The storage device 806 may further include at least an encrypting folder configured to store at least encryption keys. The encryption keys are accessible by customers/clients connected via the network switch to the system.

The storage device 806 may further utilize/add 812 at least additional virtual resources of the networkable computing devices deprived of configuration time with zero cost and downtime. The storage device 806 may change at least configuration of the virtual resources 814 determined with zero cost and downtime.

The storage device 806 may further communicate the determination of the virtual resources on the networkable computing devices to at least client/customer connected via network switch. The storage device 806 may receive the client/customer information regarding the virtual resources determined. The storage device 806 may initialize and maintain the virtual resources by allocation based on the client/customer information received. The storage device 806 may be hosted by at least a cloud service provider or at least a server or any combination thereof.

The storage device 806 may receive at least one request into the system via management console, the request is preferably received remotely and preferably associated with rules that limit the request.

The storage device 806 may generate at least a report associated with the virtual resources. The report generated is displayed using the management console.

The resource factor may include at least cost to allocate and initialize the virtual resources, or network latency, or functioning of the virtual resources, or any combination thereof for allocation of the virtual resources. The report may include information associated with the resource factor for the allocation of the virtual resources.

The system may determine a location for instantiating the virtual resources on the networkable computing devices.

The system 800 may include at least virtual machine monitor (VMM) configured to determine the virtual resources on the networkable computing devices.

In one implementation, a system for organizing and managing network resources. The system includes at least one network switch, and at least one computing device. The computing device may further include at least one network connection, and at least one storage device containing software capable of initializing and maintaining a management local area network (MLAN) comprising a firewall, and a plurality of client virtual local area networks (VLANs), wherein each client VLAN comprises a virtual firewall and a plurality of network resources.

In one implementation, a system for organizing and managing network resources is disclosed. The system may include at least one network switch and at least one server. The server comprises at least one management console to interface with at least one client; at least one network connection; and at least one storage device. The storage device may further contains a software capable of initializing and maintaining a management local area network (MLAN) comprising a firewall, and a plurality of client virtual local area networks (VLANs), wherein each client VLAN comprises a virtual firewall and a plurality of network resources. The plurality of the network resources are virtual resources determined, and allocated via a selection mechanism using at least a resource factor, on at least one networkable computing devices.

In one implementation, a distributed management system for organizing and managing network resources is disclosed. The distributed management system may include at least one network switch, and at least one server. The server may include at least one management console to interface with at least one client, at least one network connection, and at least one storage device containing software capable of initializing and maintaining a management local area network (MLAN) comprising a firewall, and a plurality of client virtual local area networks (VLANs), wherein each client VLAN comprises a virtual firewall and a plurality of network resources. The plurality of the network resources are virtual resources determined, and allocated via a selection mechanism using at least a resource factor, on at least one networkable computing device.

In one implementation, the storage device may instantiate, initialize and maintain the virtual resource at a location in the network based on the location determined by the selection mechanism using at least a resource factor. In one example, a higher weight or relevance may be placed on a handful of key factors, depending on the customer or determined from customer preferences. In some embodiments, the weight or relevance may be equally distributed across a pool of factors.

The selection mechanism considers any number of factors, which may include but is not limited to, Service Level Agreements ("SLAs") from service providers, customer/client preferences, requirements for availability, relative location of services, degree of latency, security, governance issues, availability of local resources, hypervisor features, cost of computing resources, cost of storage resources, and so on to instantiate, initialize and maintain the virtual resource.

Figure 9:
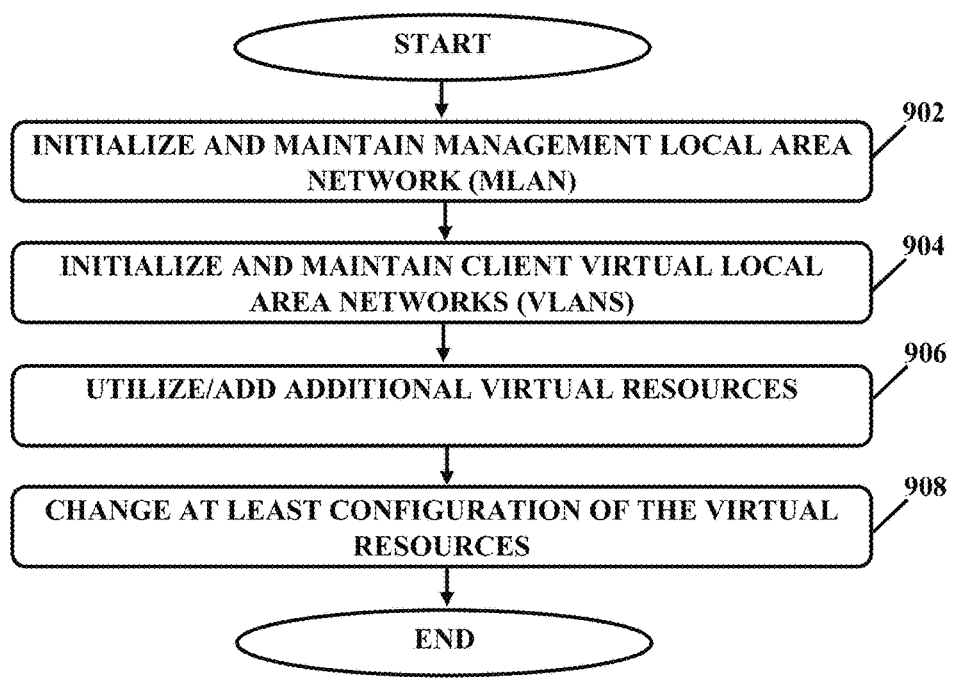
FIG. 9 demonstrates a method for organizing and managing network resources.

FIG. 9 illustrates a method for organizing and managing network resources, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described system 800.

In one implementation, method for organizing and managing network resources is disclosed.

At block 902, a management local area network (MLAN) comprising a firewall is initialized.

At block 904, a plurality of client virtual local area networks (VLANs) are added. Each client VLAN comprises a virtual firewall and a plurality of network resources. The plurality of the network resources are virtual resources determined, and allocated via a selection mechanism using at least a resource factor, on at least one networkable computing devices.

At block 906, the MLAN and clients VLANs are maintained.

At block 908, at least additional virtual resources of the networkable computing devices deprived of configuration time with zero cost and downtime may be utilized or added.

At block 910, at least configuration of the virtual resources determined time with zero cost and downtime may be changed.

A person skilled in the art may understand that any known or new algorithms by be used for the implementation of the present invention. However, it is to be noted that, the present invention provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described node embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Although implementations for system and method for initializing and maintaining a series of virtual local area networks contained in a clustered computer system have been described in language specific to structural features and/or methods, it is to be understood that the appended claims are not necessarily limited to the specific features or methods described. Rather, the specific features and methods are disclosed as examples of implementations of the system and method for initializing and maintaining a series of virtual local area networks contained in a clustered computer system.

I claim:

1. A system for organizing and managing network resources, the system comprising:
   at least one network switch;
   at least one computing device comprising:
      at least one management console to interface with at least one client;
      at least one network connection; and
      at least one storage device containing software capable of initializing and maintaining:
         a management local area network (MLAN) comprising a firewall; and
         a plurality of client virtual local area networks (VLANs), wherein each client VLAN comprises a virtual firewall and a plurality of network resources;
      wherein the plurality of network resources are virtual resources determined, and allocated via a selection mechanism using at least a resource factor, on at least one networkable computing devices, the resource factor includes at least cost to allocate and initialize the virtual resources or network latency, or functioning of the virtual resources, or any combination thereof for allocation of the virtual resources; and
      wherein the storage device further comprising: at least an encrypting folder configured to store at least encryption keys;
      wherein the storage device is further configured to:
         utilize/add at least additional virtual resources of the networkable computing devices deprived of configuration time with zero cost and downtime; and
         change at least configuration of the virtual resources determined with zero cost and downtime.

2. The system according to claim 1, wherein the encryption keys are accessible by customers/clients connected via the network switch to the system.

3. The system according to claim 1, wherein the storage device is further configured to:
   communicate the determination of the virtual resources on the networkable computing devices to at least client/customer connected via network switch;
   receive the client/customer information regarding the virtual resources determined;
   initialize and maintain the virtual resources by allocation based on the client/customer information received.

4. The system according to claim 1, wherein the storage device is hosted by at least a cloud service provider or at least a server or any combination thereof.

5. The system according to claim 1, wherein the storage device is further configured to receive at least one request into the system via management console, the request is preferably received remotely and preferably associated with rules that limit the request.

6. The system according to claim 1, wherein the storage device further comprising:
   at least virtual machine monitor (VMM) configured to determine the virtual resources on the networkable computing devices.

7. The system according to claim 6, wherein the storage device further comprises: at least a cost to allocate and initialize the virtual resources, or network latency, or functioning of the virtual resources, or the resource factor for allocation of the virtual resources or any combination thereof.

8. The system according to claim 6, further comprises generating at least a report associated with the virtual resources, the report generated is displayed using the management console.

9. The system according to claim 8, wherein the report further comprises
   including information associated with the resource factor for the allocation of the virtual resources, or any combination thereof for allocating the virtual resources.

10. The system according to claim 1, wherein the storage device further configured to generate at least a report associated with the virtual resources.

11. The system according to claim 10, wherein the report generated is displayed using the management console.

12. The system according to claim 1, wherein at least some of the plurality of the network resources comprise virtual resources.

13. The system according to claim 1, further configured to determine a location for instantiating the virtual resources on the networkable computing devices.

14. A method for organizing and managing network resources, the method comprising:
   initializing a management local area network (MLAN) comprising a firewall;
   adding a plurality of client virtual local area networks (VLANs), wherein each client VLAN comprises a virtual firewall and a plurality of network resources;
   maintaining MLAN and client VLANs; and
   wherein the plurality of the network resources are virtual resources determined, and allocated via a selection mechanism using at least a resource factor, on at least one networkable computing devices, the resource factor includes at least cost to allocate and initialize the virtual resources or network latency, or functioning of the virtual resources, or any combination thereof for allocation of the virtual resources;
   further comprising:
      storing at least encryption keys accessible by customers/clients;
      utilizing/adding at least additional virtual resources of the networkable computing devices deprived of configuration time with zero cost and downtime; and
      changing at least configuration of the virtual resources determined with zero cost and downtime.

15. The method according to claim 14, further comprising:
   communicating the determination of the virtual resources on the networkable computing devices to at least client/customer connected via network switch;
   receiving the client/customer information regarding the virtual resources determined;
   initializing and maintain the virtual resources by allocation based on the client/customer information received.

16. The method according to claim 14, further comprising receiving at least one request into the system via management console, the request is preferably received remotely and preferably associated with rules that limit the request.

17. The method according to claim 14, further comprising determining, using at least virtual machine monitor (VMM), the virtual resources on the networkable computing devices.

18. The method according to claim 14, further comprising generating at least a report associated with the virtual resources, the report generated is displayed using the management console.

19. The method according to claim 14, further comprising including at least cost to allocate the resource and initialize the virtual resources, or network latency, or functioning of the virtual resources, or any combination thereof for allocating the virtual resources.

20. The method according to claim 14, further comprising: determining a location for instantiating the virtual resources on the networkable computing devices.

21. The method according to claim 14, wherein the report further comprises:
   generating at least a report associated with the virtual resources, the report generated is displayed using the management console
   Or including at least a cost to allocate the resource and initialize the virtual resources, or network latency, or functioning of the virtual resources, or information associated with the resource factor for the allocation of the virtual resources, or any combination thereof for allocating the virtual resources.

22. A system for organizing and managing network resources, the system comprising:
   at least one network switch; and
   at least one computing device comprising:
      at least one management console to interface with at least one client;
      at least one network connection; and
      at least one storage device containing program instructions, when executed by a processor to perform the steps of:
         initializing a management local area network (MLAN) comprising a firewall;
         adding a plurality of client virtual local area networks (VLANs), wherein each client VLAN comprises a virtual firewall and a plurality of network resources;
         maintaining MLAN and client VLANs;
         determining the plurality of network resources on the networkable computing devices; determining a location for instantiating the plurality of network resources;
         wherein the plurality of network resources are virtual resources determined, and allocated via a selection mechanism using at least a resource factor, on at least one networkable computing devices, the resource factor includes at least cost to allocate and initialize the virtual resources, or network latency, or functioning of the virtual resources, or any combination thereof for allocation of the virtual resources;
         storing at least encryption keys accessible by customers/clients;
         utilizing/adding at least additional virtual resources of the networkable computing devices deprived of configuration time with zero cost and downtime; and
         changing at least configuration of the virtual resources determined with zero cost and downtime.

\* \* \* \* \*